US007633380B1

(12) United States Patent
Homola, Jr. et al.

(10) Patent No.: US 7,633,380 B1
(45) Date of Patent: Dec. 15, 2009

(54) ANTI-FRAUD SYSTEM FOR A CAR WASH STATION

(75) Inventors: Allie Joe Homola, Jr., Midland, TX (US); Gerald Lee Hall, 4715 W. Storey, Midland, TX (US) 79703

(73) Assignee: Gerald Lee Hall, Midland, TX (US)

( * ) Notice: Subject to any disclaimer, the term of this patent is extended or adjusted under 35 U.S.C. 154(b) by 287 days.

(21) Appl. No.: 11/786,065

(22) Filed: Apr. 10, 2007

(51) Int. Cl.
*G08B 1/00* (2006.01)
*G07D 7/00* (2006.01)
*G07F 7/02* (2006.01)

(52) U.S. Cl. .................. 340/309.16; 194/202; 194/210

(58) Field of Classification Search ............ 340/309.16, 340/506, 531, 538.11; 194/202, 210, 348
See application file for complete search history.

(56) References Cited

U.S. PATENT DOCUMENTS

| | | | | | |
|---|---|---|---|---|---|
| 3,929,213 | A | * | 12/1975 | Verrill | .................. 194/318 |
| 4,020,478 | A | * | 4/1977 | Hatfield | .................. 340/604 |
| 4,264,000 | A | * | 4/1981 | Burton | .................. 194/227 |
| 4,470,496 | A | * | 9/1984 | Steiner | .................. 194/200 |
| 4,503,963 | A | * | 3/1985 | Steiner | .................. 194/200 |
| 5,153,564 | A | * | 10/1992 | Hoiberg | .................. 340/604 |
| 5,226,521 | A | | 7/1993 | Oden | |
| 5,318,164 | A | | 6/1994 | Barnes et al. | |
| 5,377,804 | A | * | 1/1995 | Robirds | .................. 194/202 |
| 5,398,798 | A | * | 3/1995 | Ericson | .................. 194/202 |
| 5,553,696 | A | | 9/1996 | Burson, Jr. | |
| 5,642,801 | A | | 7/1997 | Burson, Jr. | |
| 6,000,520 | A | * | 12/1999 | Dillon et al. | .................. 194/202 |
| 6,125,989 | A | | 10/2000 | Oden | |
| 6,155,398 | A | | 12/2000 | Sagady | |
| 6,213,276 | B1 | | 4/2001 | Oden | |
| 6,513,639 | B1 | * | 2/2003 | Bryant et al. | .................. 194/202 |
| 6,571,931 | B2 | | 6/2003 | Oden | |
| 6,640,820 | B2 | | 11/2003 | Caldwell et al. | |
| 6,827,647 | B1 | * | 12/2004 | Loose et al. | .................. 463/25 |
| 2005/0000777 | A1 | * | 1/2005 | Ringdahl et al. | .................. 194/210 |

FOREIGN PATENT DOCUMENTS

| | | |
|---|---|---|
| JP | 01-219587 | 1/1989 |
| JP | 01-250189 | 5/1989 |
| JP | 01-306982 | 11/1989 |

* cited by examiner

*Primary Examiner*—Benjamin C Lee
*Assistant Examiner*—Sigmund Tang
(74) *Attorney, Agent, or Firm*—Eric Karich

(57) ABSTRACT

An anti-fraud system for a car wash station that includes a moisture sensor for sensing moisture within the car wash station, and a sensor controller adapted to operatively connect a power source with a timer of the car wash station. The sensor controller performing the following program: disconnecting the power source from the timer upon sensing moisture via the moisture sensor; waiting a period of time; sensing whether the moisture sensor detects moisture; and waiting another period of time and repeating if moisture is sensed, or reconnecting the power source to the timer if no moisture is sensed.

1 Claim, 3 Drawing Sheets

ANTI-FRAUD SYSTEM FOR A CAR WASH STATION

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to car wash stations, and more particularly to a car wash station that includes an anti-fraud system that prevents a user from injecting water into the car wash station for the purpose of attempting to trick the station in to remaining on longer than the allotted time for which the user has paid.

2. Description of Related Art

Injecting water into an automated system such as a car wash station will sometimes damage the station so that it remains stuck in the "on" position, enabling a dishonest user to wash his or her car for only a small amount of money, and sometimes even enabling him or her to wash several vehicles for the small initial payment. This process is known as "salting" the machine.

This is particularly a problem in the field of car wash systems, because the car wash system provides a ready supply of water along with a high powered sprayer that can be used for spraying the water into a payment system of the car wash system.

While the problem has not been addressed in the field of car wash systems, the prior art teaches various "anti-salting" features in the field of vending machines. The prior art teaches the use of a moisture sensor to detect water in the machine, and then turn off power to the machine until the machine is manually reset by a service technician. Examples include the following:

Robirds, U.S. Pat. No. 5,377,804, teaches a moisture-detecting apparatus for bill validators and coin mechanisms used in vending machines. The apparatus is designed to prevent vandalism by "salting" vending machines, which results in loss of product, monies, and damage to the machines. The apparatus includes a moisture-detecting probe that functions to shut off the logic lines and power to the bill validator, stopping damage to the bill validator, power supply, and coin mechanism power side. The moisture-detecting probe includes a nylon mesh having a pair of copper foil strips. When the probe gets wet, the mesh absorbs the moisture, completes a circuit between the copper foil strips, and shuts off the vending machine.

Burton, U.S. Pat. No. 4,264,000, teaches a coin operated vending machine having a pair of spaced conductors mounted on a coin chute and in position to be bridged by any electrically conductive liquid squirted into the coin slot. Bridging of the conductors by the liquid completes a circuit which disconnects vending circuitry from its power source. The spaced conductors are mounted on a non-conductive support which prevents a coin itself from contacting and bridging the conductors.

Barnes et al., U.S. Pat. No. 5,318,164, teaches an anti-salting module for reducing vandalism and minimizing damage from liquids injected into a vending machine. The anti-salting module has a housing with an integral tray for collecting liquids, and is connected beneath a bill validator in a vending machine. A rubber fillet is connected to the rear of the bill validator and directs injected fluids to the tray. A moisture sensor integral to the tray is connected to detection and control circuitry. When moisture is detected, the detection and control circuitry operates to interrupt power and control signals to the bill validator. Other external sensors, such as a second moisture sensor and a continuity sensor for monitoring the status of other vending machine components, may also be connected to the detection and control circuitry. After moisture has been detected, vending machine power and control signals can be restored only when moisture is no longer present, and a SET switch is depressed by service personnel. The above-described references are hereby incorporated by reference in full.

A problem with the prior art systems is that while shutting off the vending machine helps to protect the vending machine and to prevent theft of vended products, it leaves the vending machine inoperative for a period of time, and also requires a visit by a service technician to restart the machine. It would be preferred if a timer of the machine were temporarily shut off to protect the machine, but then automatically restarted without manual intervention on the part of the owner of the machine, allowing a user to insert money and restart the machine once the moisture has drained from the machine.

The prior art teaches various anti-salting mechanisms in the field. However, the prior art does not teach an anti-fraud system for a car wash station that temporarily turns off power to the timer of the car wash station when water is injected into the station, checks the car wash station to see if it is dry after a period of time, and then returns power to the timer once the water has drained from the car wash station. The present invention fulfills these needs and provides further related advantages as described in the following summary.

SUMMARY OF THE INVENTION

The present invention teaches certain benefits in construction and use which give rise to the objectives described below.

The present invention provides an anti-fraud system for a car wash station. The anti-fraud system includes a moisture sensor for sensing moisture within the car wash station, and a sensor controller adapted to operatively connect a power source with a timer of the car wash station. The sensor controller performing the following program: disconnecting the power source from the timer upon sensing moisture via the moisture sensor; waiting a period of time; sensing whether the moisture sensor detects moisture; and waiting another period of time and repeating if moisture is sensed, or reconnecting the power source to the timer if no moisture is sensed.

A primary objective of the present invention is to provide an anti-fraud system for a car wash station having advantages not taught by the prior art.

Another objective is to provide an anti-fraud system for a car wash station that temporarily turns off power to the timer of the car wash station when water is injected into the station, checks the car wash station to see if it is dry after a period of time, and then returns power to the timer once the system has dried out Another objective is to provide an anti-fraud system for a car wash station that prevents the car wash station from being damaged by water being sprayed into electrical control components of the car wash station.

Another objective is to provide an anti-fraud system for a car wash station that prevents theft of car washing services.

A further objective is to provide a car wash station that resumes operations following being salted without a manual reset by a service technician.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, an anti-fraud system 10 for a car wash station 20.

Figure 1:
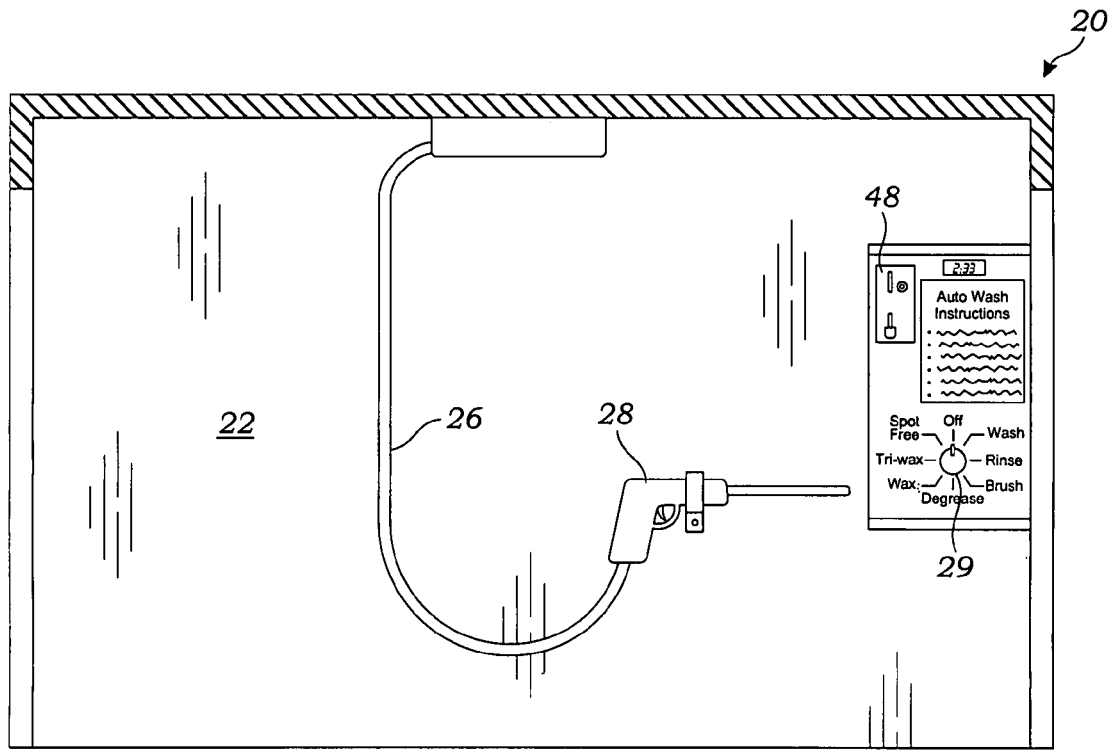
FIG. 1 is a side elevational view of one side of an interior of a car wash station according to a preferred embodiment of the present invention.
Figure 2:
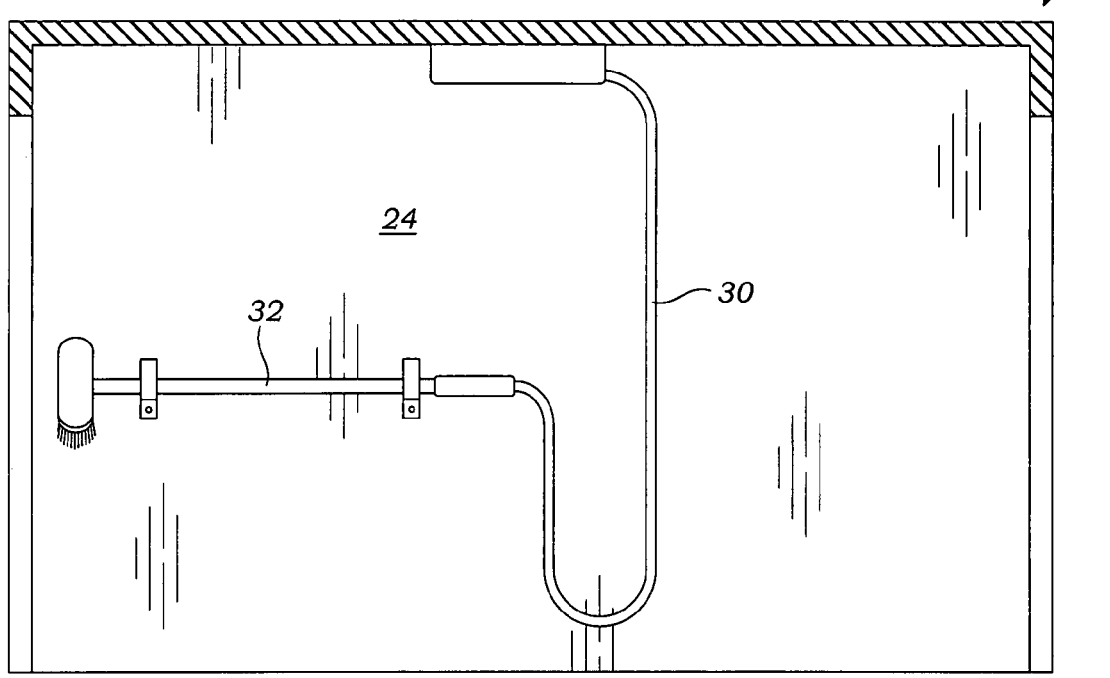
FIG. 2 is a side elevational view of an opposite side of the interior of the car wash station.

FIG. 1 is a side elevational view of one side 22 of an interior of the car wash station 20 according to a preferred embodiment of the present invention. FIG. 2 is a side elevational view of an opposite side 24 of the interior of the car wash station 20. The car wash station 20 is of standard construction, and may include any of the features known in the art.

As shown in FIG. 1, the car wash station 20 includes a flexible pressure hose 26 operably connected to a trigger activated spray nozzle 28 for spraying the fluid. Operation of the car wash station 20 is controlled by a control apparatus 29, preferably a selection switch that enables the user to select which fluids are dispensed from the trigger activated spray nozzle 28. A payment system 48, described in greater detail below, receives funds and initiates the operation of the car wash station 20.

As shown in FIG. 2, a second pressure hose 30 may also be attached to a scrub brush 32. The control apparatus 29 preferably enables the selection of the scrub brush 32 at the appropriate part of the car wash routine. Since the general construction of the trigger activated spray nozzle 28, the control apparatus 29, and the scrub brush 32, are well known in the art, they are not described in greater detail herein.

Figure 3:
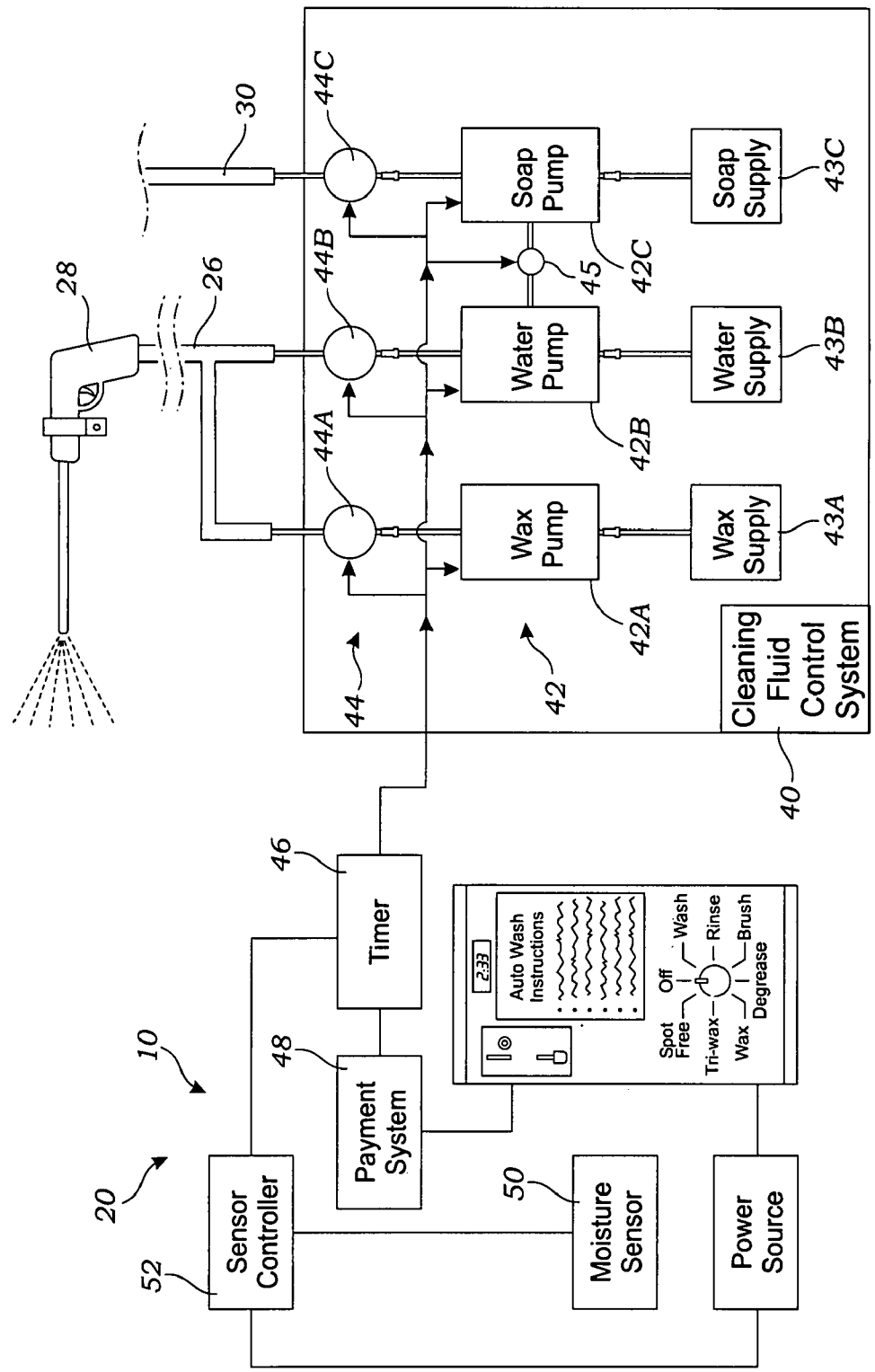
FIG. 3 is a block diagram of an anti-fraud system installed in the car wash station, the anti fraud system having a sensor controller for preventing fraud.

FIG. 3 is a block diagram of the anti-fraud system 10 installed in the car wash station 20. As shown in FIG. 3, the car wash station 20 includes a cleaning fluid control system 40 that includes a fluid pump 42 for pumping a fluid through a valve 44 and into the flexible pressure hose 26. In the present embodiment, the fluid pump 42 includes a wax pump 42A, a water pump 42B, and a soap pump 42C. The wax pump 42A is operably attached to a wax supply, and pumps the wax through a wax valve 44A 44 and into the flexible pressure hose 26. The water pump 42B is operably attached to a water supply 43B, and pumps the water through a water valve 44B 44 and into the flexible pressure hose 26. The soap pump 42C is operably attached to a soap supply 43C, and also to the water pump 42B through a cross valve 45 44. The soap pump 42C pumps the soap and the water through a soap valve 44C 44 and into the second pressure hose 30.

While this embodiment is one option for practicing the current invention, those skilled in the art that any number of mechanisms may be adapted for use with the present invention, and such alternative constructions should be considered within the scope of the present invention.

As shown in FIG. 3, a timer 46 functions to initiate function of the fluid pump(s) 42 and the valve(s) 44 so that the fluid is dispensed through the trigger activated spray nozzle 28 (or the scrub brush 32) for a period of time. A payment system 48 is operably connected to the timer 46 for receiving payment and actuating the timer 46. The term "payment system 48" is hereby defined to include any mechanism for receiving payment, including but not limited to coins receiving mechanisms for receiving currency or tokens, bill readers/validators, and any other form of payment receipt, magnetic card reader, credit systems, or other system known to those skilled in the art. While the typical car wash station 20 is coin operated, any form of payment receipt system should be considered within the scope of the present invention.

As shown in FIG. 3, the anti-fraud system 10 functions to selectively connect the power source 12 with the timer 46. The anti-fraud system 10 includes a moisture sensor 50 for sensing moisture within the payment system 48, and a sensor controller 52 adapted to operatively connect the power source 12 with the timer 46. The moisture sensor 50 may be any form of sensor that responds to the presence of the fluid, typically water, including a simple electrical conductor that is operably connected to the sensor controller 52, and which registers a change in voltage when moisture contacts the conductor. Other suitable sensors are discussed in the references cited above. Any suitable sensor known to those skilled in the art should be considered within the scope of the claimed invention.

Figure 4:
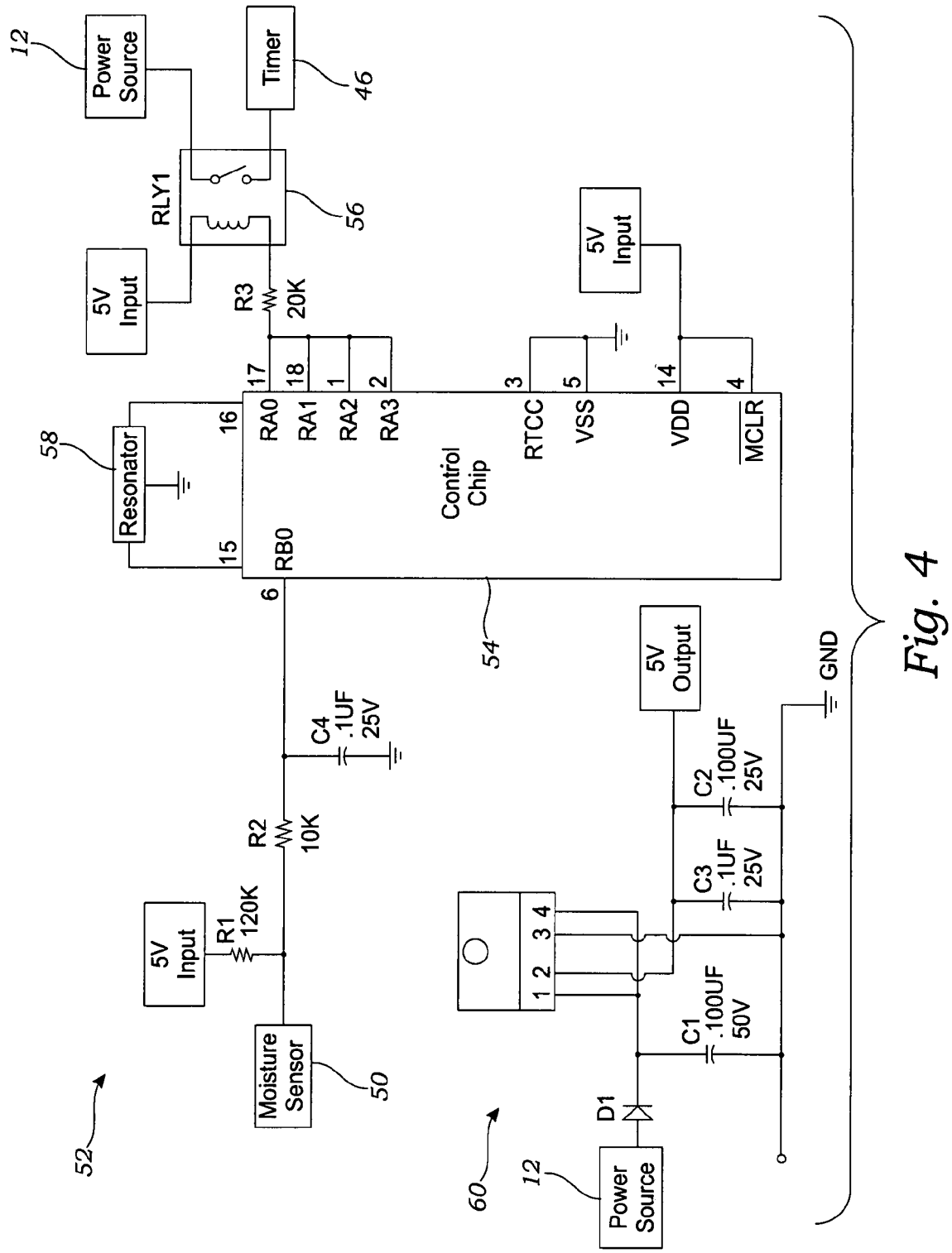
FIG. 4 is a block diagram and schematic of the sensor controller.

FIG. 4 is a block diagram and schematic of the sensor controller 52. The sensor controller 52 performs a plurality of steps to protect the car wash station 20 from salting vandalism. Upon the detection of moisture via the moisture sensor 50, the sensor controller 52 functions to disconnect the power source. 12 from the timer 46. After waiting a period of time, the sensor controller 52 senses whether the moisture sensor 50 detects moisture. If moisture is sensed, the sensor controller 52 waits another period of time and repeats the check if moisture is sensed. This continues until the fluid has drained, and the moisture is no longer sensed. Once no moisture is sensed, the power source 12 is reconnected to the timer 46 so that the car wash station 20 may resume normal operation.

In the preferred embodiment, the sensor controller 52 preferably includes a control chip 54 operably connected to a relay 56 for controlling the operative attachment between the power source 12 and the timer 46. When the control chip 54 senses a change in voltage from the moisture sensor 50, it opens the relay and disconnects the power source 12 from the timer 46. The sensor controller 52 preferably includes a resonator 58 for determining the passage of the period of time, so that the sensor controller 52 can determine when to re-check the moisture sensor 50.

A converter 60 is preferably operatively attached to the power source 12 for providing a lower output current for use by the control chip 54. Since the converter 60 and the general electronics involved with these elements of the invention are well known to those skilled in the art, given the teachings of the present invention, they are not described in greater detail herein.

The terminology used in the specification provided above is hereby defined to include similar and/or equivalent terms, and/or alternative embodiments that would be considered obvious to one skilled in the art given the teachings of the present patent application. Additionally, the words "a," "an," and "one" are defined to include one or more of the referenced item unless specifically stated otherwise. Also, the terms "have," "include," "contain," and similar terms are defined to mean "comprising" unless specifically stated otherwise.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A car wash station powered by a power source, the car wash station comprising:
   a fluid pump for pumping a fluid through a valve and into a hose;
   a timer for operably controlling the fluid pump and/or the valve so that the fluid is dispensed through the hose for a period of time;
   a payment system for receiving payment and actuating the timer; and
   an anti-fraud system for selectively connecting the power source with the timer, the anti-fraud system comprising:
      a moisture sensor for sensing moisture within the payment system; and
      a sensor controller adapted to operatively connect the power source with the timer of the car wash station, the sensor controller performing the following program:
         monitoring moisture within the payment system via the moisture sensor;
         disconnecting the power source from the timer upon sensing moisture, causing the timer to reset and stopping the operation of the car wash station; and
         reconnecting the power source to the timer such that the timer is operative upon receipt of further payment via the payment system.

* * * * *